J. M. JONES.
STONE SPREADER.
APPLICATION FILED MAR. 25, 1916.
1,194,197.
Patented Aug. 8, 1916.
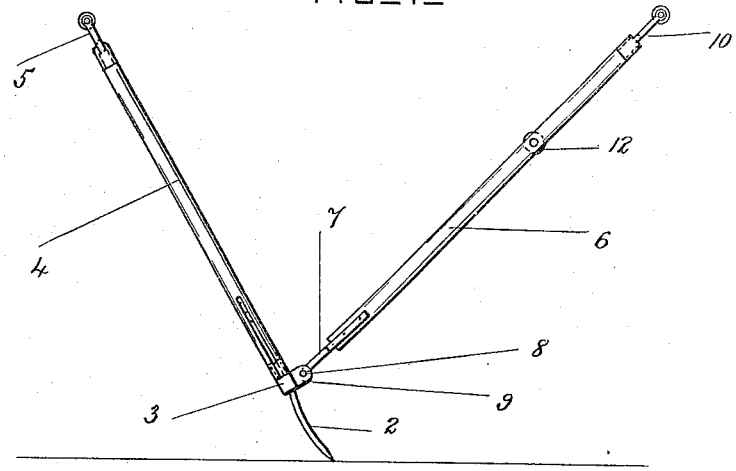
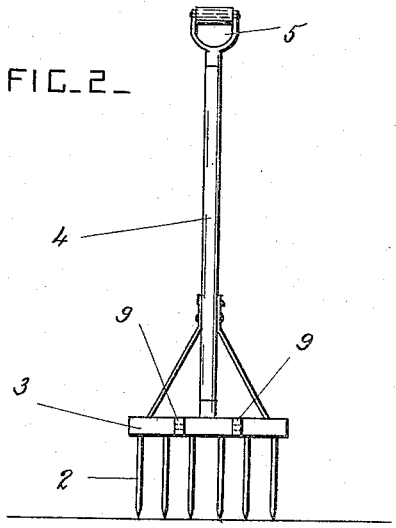
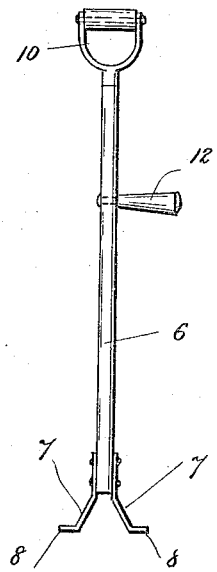

UNITED STATES PATENT OFFICE.

JOSEPH M. JONES, OF CARDINGTON, OHIO.

STONE-SPREADER.

1,194,197. Specification of Letters Patent. Patented Aug. 8, 1916.

Application filed March 25, 1916. Serial No. 86,621.

*To all whom it may concern:*

Be it known that I, JOSEPH M. JONES, a citizen of the United States, residing at Cardington, in the county of Morrow and State of Ohio, have invented certain new and useful Improvements in Stone-Spreaders; and I do hereby declare the following to be a full, clear, and exact description of the invention, such as will enable others skilled in the art to which it appertains to make and use the same.

This invention relates to implements for spreading and leveling stones and gravel in building roads; and it consists in the novel construction and combination of the parts hereinafter fully described and claimed.

In the drawings, Figure 1 is a side view of a stone spreader constructed according to this invention. Fig. 2 is a front view of the fork with the pivoted pulling handle removed. Fig. 3 is a front view of the pivoted pulling handle.

The spreader is provided with a fork 2 having a crossbar 3 and prongs of any approved number and shape. A main handle 4 is rigidly connected to the crossbar 3 by suitable fastenings and braces, and it preferably has a loop-shaped hand hold 5 at its extreme end.

An auxiliary pulling handle 6 is provided, and has diverging arms 7 secured to it at one end which terminate in pivots 8 which are pivoted in holes in lugs 9 which project from the front side of the crossbar. The pivots 8 are formed integral with the arms 7, and the lugs 7 are spaced relatively wide apart so that the strains are distributed to the ends of the fork. The handle 6 preferably has a loop-shaped hand hold 10 at its other end, and a pulling hand hold 12 is arranged to project laterally from one side of it at a suitable distance from its pivots.

The fork is supported chiefly by the main handle, and it is pulled along so as to spread the stones or gravel evenly over the road by means of the auxiliary handle, and the device is found to be a very efficient labor-saving implement.

What I claim is:

In a stone spreader, a fork provided with a toothed crossbar having widely spaced lugs on one side, a main handle secured to the said crossbar, an auxiliary handle, and a pair of diverging arms having their upper ends secured to the auxiliary handle and having outwardly projecting pivots formed integral with their lower ends and pivoted in holes in the said lugs.

In testimony whereof I have affixed my signature.

JOSEPH M. JONES.

Copies of this patent may be obtained for five cents each, by addressing the "Commissioner of Patents, Washington, D. C."